UNITED STATES PATENT OFFICE.

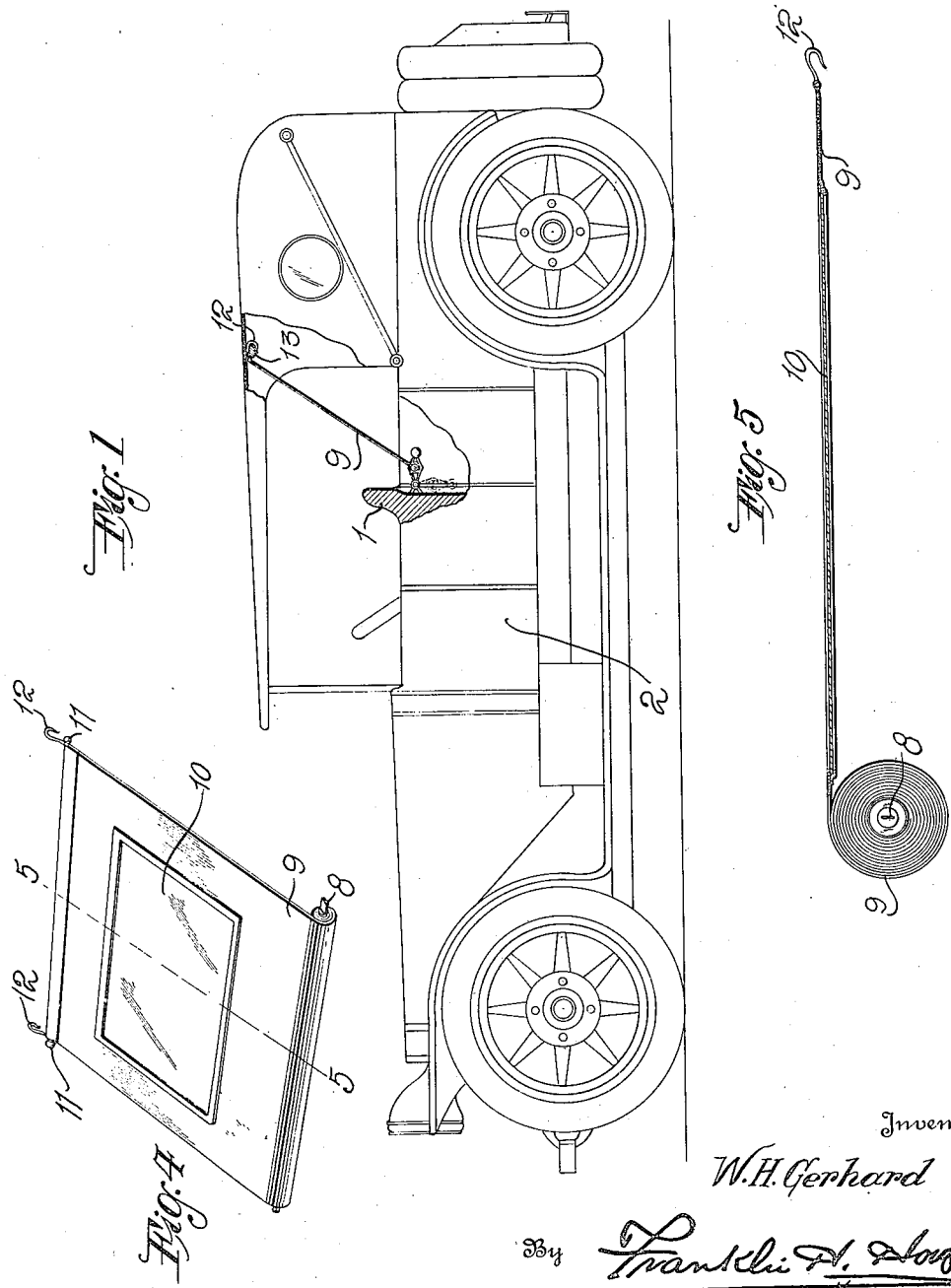

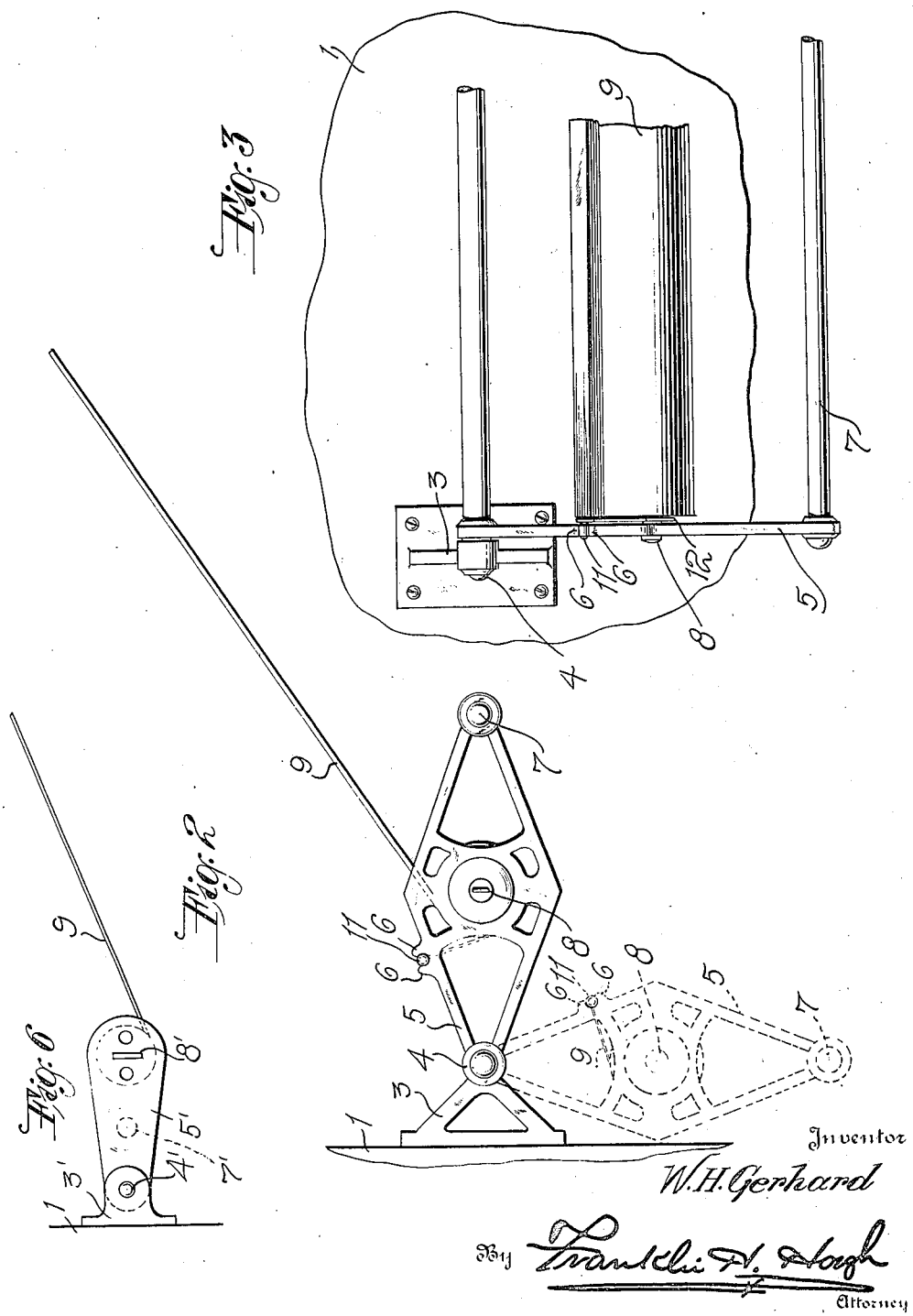

WILLIAM H. GERHARD, OF AUSTIN, TEXAS.

ROLLING WINDSHIELD.

1,380,894.  Specification of Letters Patent.  Patented June 7, 1921.

Application filed March 23, 1920. Serial No. 368,143.

*To all whom it may concern:*

Be it known that I, WILLIAM H. GERHARD, a citizen of the United States, residing at Austin, in the county of Travis and State of Texas, have invented certain new and useful Improvements in Rolling Windshields; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide an attachment for automobiles in the nature of a wind, rain and dust shield, which is very simple of construction and thoroughly practical in use, and which, when not in operative position, may be rolled into a small compass, so as not to be in the way.

A further object is to support said wind, rain and dust shield from a bracket carrying the robe rail of the automobile.

With these objects in view, the invention resides in a wind, rain and dust shield, comprising a strip of flexible material wound upon a spring actuated roller, rotatably mounted in a bracket carrying the robe rail, said bracket being pivotally mounted at one end to the automobile, so as to be swung from a depending position to a horizontal position.

The invention in its preferred form is clearly shown in the accompanying drawings, in which:

Figure 1 is a view in side elevation of an automobile, partly in section, showing the application of my invention thereto, Fig. 2 is a view in side elevation of the device of my invention, the bracket being shown in horizontal position with the wind shield raised.

Fig. 3 is a fragmentary view in front elevation of the device of my invention, showing the bracket in lowered position and the wind shield in inoperative position, Fig. 4 is a detached detail view in perspective of the wind shield, Fig. 5 is a sectional view on the line 5, 5 of Fig. 4, and Fig. 6 is a modification showing curtain mounted on free end of bracket.

Referring now in detail to the drawings: 1 designates the front seat of an automobile 2, carrying at its rear a bracket 3, to which is pivotally connected, as at 4, a swinging support, or bracket, 5.

Said bracket 5 carries on each of the side members thereof ears 6, 6, forming therebetween a pocket for a purpose presently appearing. The bracket, or support, 5 carries at its front, or free end, a rail 7, constituting the robe rail of the automobile, upon which wraps and robes, or the like, may be hung.

Intermediate the ends of said support 5, a spring-wound roller 8 is rotatably supported, said roller extending between the two side members of the bracket 5. Upon said roller 8 is wound a strip of flexible material 9, which is advantageously waterproof, and which is apertured for the reception of a transparent pane 10, preferably of celluloid.

Secured to one end of said strip 9 is a rod, provided at its ends with heads 11, 11, projecting beyond the sides of the strip 9.

Adjacent said heads 11, 11, the strip 9 carries hooks 12, 12, which, when the strip 9 is in extended position, as shown in Fig. 1, are adapted to engage with projections 13, carried by the top of the automobile, as shown, thereby detachably securing said strip in operative position.

When released from said projections 13, the strip 9, constituting the wind, rain and dust shield, is automatically wound upon the spring roller 8 and the ends of said rod, which carry the heads 11, 11 are moved into the pocket between the ears 6, 6 of the bracket 5, thereby holding the wind shield in collapsed position in a desirable manner.

It will thus be seen that my shield is mounted upon the rear of the front seat of an automobile and is readily adjusted into operative position for the purpose of protecting the passengers on the rear seat against rain, wind or dust. It will be seen further that when the shield is not in use it may be easily collapsed and be out of the way, yet immediately accessible for use.

It will further be noted that my device is light and durable and may be readily installed in automobiles of the ordinary type, and that the cost of installation is about one-twentieth that of heavy plate glass that must necessarily be carried in frames which are now sometimes used.

What I claim to be new is:

1. An attachment for automobiles, comprising a bracket adapted to be pivoted to the rear of the front seat of an automobile and carrying a spring actuated roller and a curtain wound upon said roller and carrying at one end securing means adapted to be detachably secured to the automobile top, said curtain carrying at said end a rod, and said bracket being provided with recesses for supporting said rod when the curtain is fully wound upon said roller.

2. An attachment for automobiles, comprising a bracket adapted to be pivoted to an automobile seat and provided along one edge thereof with projections forming therebetween pockets, a spring actuated roller carried by said bracket, a curtain wound upon said roller and carrying at one end fastening means adapted to secure said end of the curtain to the automobile top, and a rod carried by said end of the curtain and provided at both ends with knobs, said rod being adapted to seat in said pockets.

3. An automobile attachment, comprising a bracket adapted to be pivotally secured to the automobile seat and carrying at one end a rail, constituting a robe rail, a spring actuated roller also carried by said bracket and a curtain wound upon said roller and provided at one end with means adapted to secure the curtain to the automobile top.

In testimony whereof I hereunto affix my signature.

WM. H. GERHARD.